(12) United States Patent
Benkreira et al.

(10) Patent No.: US 11,516,197 B2
(45) Date of Patent: Nov. 29, 2022

(54) TECHNIQUES TO PROVIDE SENSITIVE INFORMATION OVER A VOICE CONNECTION

(71) Applicant: Capital One Services, LLC, McLean, VA (US)

(72) Inventors: Abdelkader M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 342 days.

(21) Appl. No.: 16/863,811

(22) Filed: Apr. 30, 2020

(65) Prior Publication Data

US 2021/0344660 A1    Nov. 4, 2021

(51) Int. Cl.
| | | |
|---|---|---|
| *H04L 65/1069* | (2022.01) | |
| *H04L 9/40* | (2022.01) | |
| *G06Q 40/02* | (2012.01) | |
| *G10L 13/00* | (2006.01) | |
| *G10L 17/00* | (2013.01) | |
| *G10L 17/06* | (2013.01) | |
| *H04L 65/403* | (2022.01) | |

(52) U.S. Cl.
CPC ............. *H04L 63/08* (2013.01); *G06Q 40/02* (2013.01); *G10L 13/00* (2013.01); *G10L 17/00* (2013.01); *G10L 17/06* (2013.01); *H04L 65/403* (2013.01); *H04L 65/1069* (2013.01)

(58) Field of Classification Search
CPC ...... G06F 3/167; G06F 21/32; G06F 21/6218; G06F 21/45; G06Q 20/02; G06Q 20/16; G06Q 20/3272; G06Q 20/351; G06Q 20/40; G06Q 40/02; G06Q 10/103; G06Q 20/10; G06Q 20/305; G06Q 20/40145; G10L 13/00; G10L 15/22; G10L 17/00; G10L 17/06; G10L 15/30; G10L 17/02; H04L 63/06; H04L 63/08; H04L 63/10; H04L 65/1069; H04L 65/403; H04L 51/18; H04L 63/0853; H04L 63/0861; H04L 63/105; G07C 9/257
USPC ........ 726/7, 4; 235/379; 379/88.02; 713/168
See application file for complete search history.

(56) References Cited

U.S. PATENT DOCUMENTS

| | | | |
|---|---|---|---|
| 5,392,282 A | 2/1995 | Kiema | |
| 8,798,237 B2 | 8/2014 | Lee | |
| 9,183,552 B2 | 11/2015 | Kauniskangas et al. | |
| 10,877,637 B1* | 12/2020 | Antos | G06F 21/32 |
| 10,972,458 B1* | 4/2021 | Gaeta | G06F 21/32 |
| 11,127,405 B1* | 9/2021 | Antos | G10L 15/30 |
| 11,200,572 B2* | 12/2021 | Kumawat | G06Q 20/40 |

(Continued)

OTHER PUBLICATIONS

International Search Report and Written Opinion for International Patent Application No. PCT/US2021/030065 dated Jun. 23, 2021, 15 pages.

*Primary Examiner* — Gerald Gauthier
(74) *Attorney, Agent, or Firm* — KDB

(57) ABSTRACT

Embodiments may generally be directed components and techniques to detect a request to provide banking account information over a one or more voice connections, identify the requested banking account information, and generate speech data representing the banking account information requested. In embodiments further include communicating the speech data to another device.

20 Claims, 9 Drawing Sheets

(56) References Cited

U.S. PATENT DOCUMENTS

| | | | |
|---|---|---|---|
| 2003/0078775 A1 | 4/2003 | Plude et al. | |
| 2005/0125235 A1 | 6/2005 | Lazay | |
| 2005/0203729 A1 | 9/2005 | Roth et al. | |
| 2005/0208981 A1 | 9/2005 | Kawasaki | |
| 2005/0239511 A1 | 10/2005 | Boillot et al. | |
| 2006/0100879 A1 | 5/2006 | Jakobsen et al. | |
| 2007/0295803 A1* | 12/2007 | Levine | G06Q 20/10 235/379 |
| 2008/0048025 A1 | 2/2008 | Fitzgerald et al. | |
| 2010/0054429 A1* | 3/2010 | Tonini | G06Q 20/305 379/88.02 |
| 2010/0178956 A1 | 7/2010 | Safadi | |
| 2011/0138176 A1* | 6/2011 | Mansour | H04L 9/3218 713/168 |
| 2014/0373104 A1* | 12/2014 | Gaddam | H04L 63/105 726/4 |
| 2015/0379250 A1* | 12/2015 | Saito | G07C 9/257 726/7 |
| 2016/0050203 A1* | 2/2016 | Hefetz | H04L 51/18 726/7 |
| 2016/0065558 A1* | 3/2016 | Suresh | G06F 21/32 726/7 |
| 2016/0197923 A1 | 7/2016 | Schlatter et al. | |
| 2017/0004471 A1* | 1/2017 | Jiva | G06Q 20/16 |
| 2017/0161516 A1* | 6/2017 | Mondal | H04L 63/06 |
| 2017/0214687 A1* | 7/2017 | Klein | H04L 63/0861 |
| 2017/0221488 A1* | 8/2017 | Xiong | G10L 17/02 |
| 2018/0096333 A1* | 4/2018 | Studnicka | G06Q 20/40145 |
| 2018/0174152 A1* | 6/2018 | Fortin | G10L 15/22 |
| 2020/0097965 A1* | 3/2020 | Castoro | G10L 15/22 |
| 2021/0097158 A1* | 4/2021 | Lee | G06F 21/45 |
| 2021/0110819 A1* | 4/2021 | Lakshminarayana | G06Q 20/02 |
| 2021/0176229 A1* | 6/2021 | Xuan | H04L 63/0853 |
| 2021/0211421 A1* | 7/2021 | Shetty | G10L 17/06 |
| 2021/0304772 A1* | 9/2021 | Shetty | G06Q 10/103 |
| 2021/0344660 A1* | 11/2021 | Benkreira | G06Q 40/02 |
| 2022/0148005 A1* | 5/2022 | Leger | G06F 3/167 |

* cited by examiner

200

```
┌─────────────────────────────────────────┐
│ DETECT A REQUEST TO PROVIDE SENSITIVE   │
│ INFORMATION OVER A VOICE CONNECTION,    │
│ WHEREIN THE VOICE CONNECTION IS         │
│ ESTABLISHED BETWEEN THE MOBILE DEVICE   │
│ AND ANOTHER PHONE DEVICE VIA THE        │
│ COMMUNICATION INTERFACE                 │
│ 205                                     │
└─────────────────────────────────────────┘
                    │
                    ▼
┌─────────────────────────────────────────┐
│ APPLY A SPEECH-RECOGNITION ANALYZER TO  │
│ IDENTIFY THE SENSITIVE INFORMATION IN   │
│ THE REQUEST                             │
│ 210                                     │
└─────────────────────────────────────────┘
                    │
                    ▼
┌─────────────────────────────────────────┐           Successful
│ PERFORM AN AUTHENTICATION OPERATION TO  │──────────────────────▶ ( A )
│ AUTHENTICATE A USER OF THE MOBILE       │
│ DEVICE AS ONE OF ONE OR MORE            │
│ AUTHORIZED USERS                        │
│ 215                                     │
└─────────────────────────────────────────┘
                    │ Unsuccessful
                    ▼
┌─────────────────────────────────────────┐
│ PREVENT COMMUNICATION OF THE SENSITIVE  │
│ INFORMATION TO THE OTHER PHONE DEVICE   │
│ 220                                     │
└─────────────────────────────────────────┘
```

FIG. 2A

TECHNIQUES TO PROVIDE SENSITIVE INFORMATION OVER A VOICE CONNECTION

BACKGROUND

Today, the majority of people utilize mobile devices to conduct much of their day-to-day activities such as conducting banking activities, performing business tasks, utilizing for entertainment, etc. People are also utilizing their mobile devices to conduct telephone calls and speak with other people. In some instances, these telephone calls may require the user to speak aloud, which may be overheard by other people nearby. Due to the mobile nature of the mobile devices may be used in public locations. Other people overhearing the user's conversation may be problematic when the user is saying sensitive information, such as personal information, banking information, health information and so forth. For example, a large number of purchases are still made over telephone calls. These interactions typically require the user to read aloud sensitive information such as their credit card number, expiration date, and security code. These interactions can take a long time, are prone to errors, and opens the door to 3rd party eaves droppers who can steal the sensitive information. Thus, embodiments discussed herein relate to solving these problems and enable users to provide sensitive information in a secure manner.

SUMMARY

Embodiments may be generally directed to detecting a request for sensitive information over a phone connection, electronically generating the sensitive data, and provide it a user or person over a phone connection. For example, embodiments may include systems and techniques to detect a request to provide banking account information over a voice connection, wherein the voice connection is established between the mobile device and a phone device via the communication interface, apply a speech-recognition analyzer to identify the banking account information in the request, and generate speech data representing the banking account information requested, wherein the speech data is in an audible format. Embodiments also include techniques to cause communication of the speech data to the phone device via the communication interface on the voice connection.

In another example, embodiments may include system and techniques to detect a request to provide banking account information over a three-way voice connection, apply a speech-recognition analyzer to identify the banking account information in the request, and generate speech data representing the banking account information requested, wherein the speech data is in an audible format capable of being played through a speaker of the second phone device. Embodiments further include techniques to cause communication of the speech data on the three-way voice connection.

DETAILED DESCRIPTION

Various embodiments may be generally directed to systems, devices, apparatuses, and so forth to enable users to provide sensitive information over a voice connection between telephone devices. Occasionally, people are asked to provide sensitive information during a voice call, such as providing bank card information to perform a transaction. However, when this information is spoken by a user, other people in the vicinity may hear the sensitive information and steal it. Embodiments discussed herein enable users to provide the information without saying it out loud. For example, embodiments include perform one or more operations to detect when sensitive information is being requested, determine the information requested, generate synthesized speech data including the requested information, and providing the information over the voice connection.

Although embodiments discussed herein are directed to sharing bank account information over the voice connection, embodiments are not limited in this manner. The techniques discussed herein can be applied to any situation where a user is providing sensitive information, e.g., medical information, social security information, personal information such as an address, phone number, and so forth.

Various embodiments may include one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or fewer elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
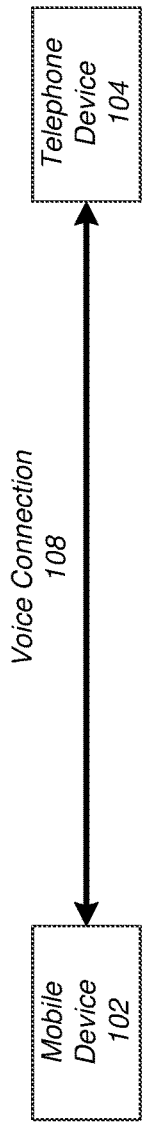
FIG. 1A illustrates an example of a communication system.

FIG. 1A illustrates an example of a communication system 100 to enable users to provide bank account information to another party over a voice connection 108 without people in the hearing the sensitive information. The system 100 may enable a user, via a mobile device 102, to conduct a telephone voice conversation with another person via phone device 104. The telephone voice conversation may include requiring the user to give the person their banking account information, such as a credit or debit card number over the voice connection 108. Previously, the user would be required to verbally say their banking accounting information to the other person. However, verbally providing the banking information runs the risk of someone else hearing and stealing the information. Embodiments discussed herein overcome these issues and include the mobile device 102 detecting the request for the banking account information, generating speech data including the requested banking account information, and communicating the speech data to the phone device 104 and the other person. Thus, the mobile device 102 itself "speaks" the bank account information and the user is not required to say the information out loud and for other people to hear.

In embodiments, the system 100 may enable a voice connection 108 to be established between the mobile device 102 and the telephone device 104. The mobile device 102 may be any device capable of conducting a voice telephone call, e.g., a mobile phone device, a smartphone, a personal digital assistant, a wearable device, a smart home device, and so forth. In some instances, the mobile device 102 may be a telephone device, such as a landline telephone. The telephone device 104 may also be any type of device capable of making a telephone call over a voice connection 108 including a landline telephone, a mobile device, a smartphone, and so forth.

In embodiments, the mobile device 102 may establish a voice connection 108 with the telephone device 104 by establishing a call with the telephone device 104 over one or more of a cellular telephone network, voice over Internet Protocol (VOIP) network, a public switched telephone network, or a combination thereof. In one example, the mobile device 102 may establish the voice connection 108 with the telephone device 104 by performing an outbound call based on received user input, e.g., a user selection on a touchscreen interface to initiate a call to someone. In another example, the mobile device 102 may establish the voice connection 108 based on reception of an incoming call, e.g., the user of telephone device 104 calls the user of mobile device 102. Once the voice connection 108 is established between the mobile device 102 and telephone device 104, the users may verbally communicate with each other.

In some instances, a conversation may include a user of the telephone device 104 verbally requesting sensitive information, such as banking account information to perform a transaction. For example, the user of mobile device 102 may call a pizza parlor to order a pizza and may be required to give banking account information over the voice connection 108 to finalize the order. Embodiments are not limited to this example, and embodiments discussed herein apply to any instance where a user is required to provide sensitive information verbally to another user.

In embodiments, the mobile device 102 may detect the request to provide the banking account information over a voice connection 108. In one example, the mobile device 102 may automatically detect the request by utilizing a speech recognition analyzer. The speech recognition analyzer may be software trained to detect keywords relating to the request for sensitive information, such as banking information. The speech recognition analyzer may be a stand-alone software component or application (app) on the mobile device 102 or may be implemented as part of another app, such as a banking app or an app associated with a banking provider. In the banking information example, the keywords may include terms, such as "bank account number", "credit card number", "debit card number", "name", "expiration date", "Card Verification Value", "CVV", and so forth. Other sensitive information may include a person's social security information, medical information, and so forth. In one example, the speech recognition analyzer may operate in the background and may listen for one or more of the keywords received in an audible format via the interface coupled with the voice connection 108. The speech recognition analyzer may utilize a speech recognition technique to translate received spoken words into text and compare the text to one or more keywords stored in memory. A detection occurs when a match occurs between a keyword and translated spoken word. The speech recognition analyzer may utilize techniques such as pattern matching, pattern and feature analysis, statistical analysis, and artificial neural networks. In one example, the speech recognition analyzer may receive the speech over the voice connection 108 and determine soundwave patterns and generate spectrograms (frequency patterns) by applying analog to digital conversion techniques and perform fast fourier transform processing. The speech recognition analyzer may determine a sequence of acoustic frames and generate "beads-on-a-string" by performing feature analysis and apply a phonetic dictionary. A hidden markov model may be built based on the sequence of acoustic frames and "bead-on-a-string" and the speech may be recognized.

The mobile device 102, based on the request, may perform additional operations to provide the requested banking account information over the voice connection 108, i.e., answer the request. In some instances, the mobile device 102 may perform one or more security operations. For example, the mobile device 102 may require a user to authenticate himself or herself to provide the sensitive information. For example, the mobile device 102 executes an authentication routine and requires the user of the mobile device 102 to enter one or more authenticating inputs, e.g., a password, a password pattern, a biometric, etc. In some instances, two-part authentication may be utilized, e.g., a password and email confirmation.

In one example, the mobile device 102 may require the user to enter their username and password to entering a banking app associated with the banking account information. The mobile device 102 may present a prompt on a display device for the user to enter their username and password to access a banking app, for example. The mobile device 102 may receive a user input via a user input device, from the user including a username entry and a password entry. The mobile device 102 may authenticate the user of the mobile device 102 as one of the one or more authorized users of the bank account when the username entry matches an authenticate username and the password entry matches an authenticate password. In another example, the mobile device 102 may receive, via an input device, a biometric input, and authenticate the user of the mobile device 102 as one of the one or more authorized user of the bank account when the biometric input matches an authentic biometric input. Embodiments are not limited to these examples.

In embodiments, the mobile device 102 may determine whether to communicate the banking account information to the telephone device 104 based on whether the user is authenticated by the mobile device 102. If the user is not authenticated, the mobile device 102 may prevent the banking account information from being sent to the telephone device 104. If the user is authenticated, the mobile device 102 may send the banking account information to the telephone device 104. To send the information, the mobile device 102 may determine what banking account information to send to the telephone device 104 based on the received request. For example, the translated text output of the speech recognition analyzer may indicate the banking account information requested, e.g., banking account number, an expiration date, a CVV, or a combination thereof. The mobile device 102 may determine the banking account information requested and retrieve the information from memory or a storage device, which may be a secured storage or memory. In some instances, the mobile device 102 may communicate and perform a look up to retrieve the requested information in a database, which may be remote from the mobile device 102 and/or in a cloud-based system.

In embodiments, the mobile device 102 may generate speech data representing the banking account information requested. The speech data may be in an audible format capable of being played through a speaker of the receiving device, e.g., telephone device 104. In one example, the mobile device 102 utilizes a speech synthesizer to generate the speech data. The speech synthesizer may be a standalone software application and/or implemented as part of a banking app. The requested information may be in a text format in storage, memory, and/or a database, and the mobile device 102 including the speech synthesizer may synthesize the text to convert into speech data that can audibly be heard by the user of device 104.

In embodiments, the speech synthesizer may include a front-end component and a back-end component. The front-end component may convert the text into equivalent written-out words, e.g., text normalization, pre-processing, and tokenization. The front-end component may then assign phonetic transcriptions to each word and divide the text into units, such as phrases, clauses, and sentences. The back-end component may further process the text by converting the symbolic linguistic representations into sound, e.g., speech data. The mobile device 102 may cause the speech data to be communicated, via an interface coupled to the voice connection 108, to the telephone device 104.

In some instances, mobile device 102 may be configured to detect an error or issues with the speech data and repeat communication of the speech data. For example, the recipient of the speech data may not understand or may miss one or more words spoken on the telephone device 104. The speech data may become inaudible due to interference during transmission or background noise may interfere with the recipient hearing the speech data. The mobile device 102 may detect the interference via noise detected on the communication link and/or the recipient may request a clarification and that the information to be repeated. For example, the mobile device 102 including the speech recognition analyzer may detect the request to repeat the banking account information and cause the speech data of the banking account information to be resent. In some instances, the recipient may request for specific banking account information to be repeated, e.g., the bank account number. The speech recognition analyzer may determine what information is being requested by performing speech-recognition and cause only the specific requested information may be sent to the telephone device 104. Embodiments may also include regenerating and generating new speech data corresponding to the requested repeated information. In other instances, the mobile device 102 may resend the original speech data.

In some embodiments, the mobile device 102 may apply one or more security measures or usage restrictions when sharing the sensitive information with the telephone device 104. For example, the mobile device 102 may apply a security measure to banking account information by generating and utilizing a virtual banking account number corresponding to the banking account number and providing the virtual bank account number to the telephone device 104. More specifically, the mobile device 102 may generate the speech data include the virtual banking account number and send the speech data with the virtual banking account number to the telephone device 104. Using the virtual banking account number may enable one or more restrictions to be applied for the transaction. For example, the mobile device 102 may apply a time limit restriction such that the virtual banking account number may only be used to perform transactions within a certain amount of time. Other restrictions may include an amount restriction limiting the total amount that can be charged against the virtual number and a location restriction limiting the range or area where a transaction may occur.

In some instances, the mobile device 102 may determine one or more of the restrictions based on information relating to the requestor and the telephone device 104. For example, the mobile device 102 may determine an area to limit the transaction for shared banking account information based on an area associated with a phone number associated with the other phone device 104. The mobile device may then apply a location restriction for the use of the shared information based on the determined area. The mobile device 102 may utilize phone number lookup techniques to determine the phone number.

Figure 1B:
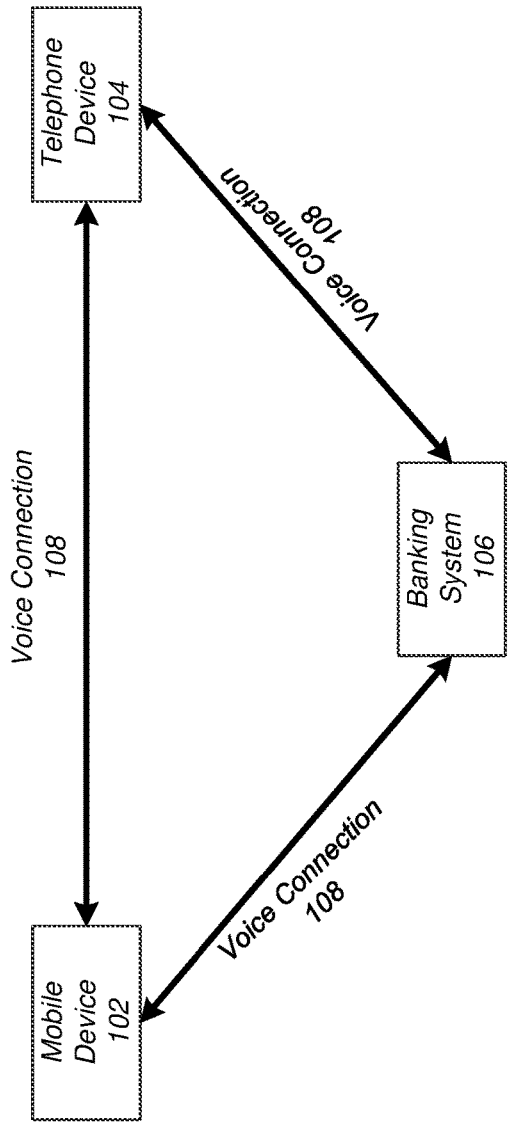
FIG. 1B illustrates a second example of a communication system.

In embodiments, the mobile device 102 may detect and/or receive a request to provide banking account information over a voice connection 108 and utilize a third-party system or banking system to provide the information. FIG. 1B illustrates one example of a communication system 120 in which a mobile device 102 may utilize a third-party system, such as a banking system 106 to provide the banking account information. The banking system 106 may include one or more computing devices, such as servers to answer calls, determine requested information, and provide the information over one or more voice connections 108. In embodiments, the banking system 106 may include cloud-based computing resources, such as processing resources, memory resources, and storage resources. The banking system 106 may be operated by a bank and/or outsourced to an automated call-center utilized by a bank to handle calls. Embodiments are not limited in this manner.

In embodiments, a mobile device 102 may establish a voice connection 108 with the telephone device 104, as similarly discussed above in FIG. 1A. However, in this example, the mobile device 102 may detect a request for the banking account information and initiate a three-way communication or connection between the mobile device 102, the telephone device 104, and the banking system 106 by establishing additional voice connections 108. For example, the mobile device 102 may call a phone number associated with the banking system 106 and an automated answering system hosted by the banking system 106 may answer the call. The mobile device 102 may establish the three-way connection such that a user of the mobile device 102 and the telephone device 104 may hear the speech data from the banking system 106. In embodiments, the three-way connection may be generated by the mobile device 102 using known three-way calling techniques, and the three-way connections may include one or more voice connections 108 over a cellular telephone system, a VOIP telephone system, a public switched telephone system, or combination thereof.

In the illustrated example of FIG. 1B, the mobile device 102 may detect the request to provide banking account information over a voice connection 108 between the mobile device 102 and the telephone device 104. As discussed above, the mobile device 102 may automatically detect the request by utilizing a speech recognition analyzer. The mobile device 102, based on the request, may establish a voice connection 108 between the mobile device 102 and the banking system 106. In some instances, the mobile device 102 may first require the user to authenticate prior to establishing a connection. The mobile device 102 may utilize any type of authentication as previously discussed, username/password combo, password, secure pattern, biometric input, two-part authentication, and so forth. If the mobile device 102 does not authenticate the user, the mobile device 102 may not contact the banking system 106. Alternatively, if the mobile device 102 does authenticate the user, the mobile device 102 may call the banking system 106 and generate a three-way call using a three-way calling technique. In some instances, the mobile device 102 may establish the connection and the banking system 106 may perform the authentication techniques. In instances, the three-way call may be halted when authentication fails.

The banking system 106 may perform one or more operations to provide the requested banking account information. In some instances, the banking system 106 may require the user of the telephone device 104 to repeat the request or state the request once the three-way communication is established, perform the speech recognition analysis on the request, and determine the requested information. In some instances, the mobile device 102 may determine and/or provide the information. For example, the mobile device 102 may provide a recording of the request to the banking system 106 in an audible format. In another example, the mobile device 102 may generate text data of the request using the speech recognition and provide the text data to the banking system 106 over a data connection (not shown). The text data may be the requested banking account information in a text format.

In embodiments, the banking system 106 may determine the banking account information to communicate to the telephone device 104 based on the request spoken by a user of the telephone device 104, a recording of the request from the mobile device 102, and/or a text data version of the request received from the mobile device 102. For example, the banking system 106 may receive a request from a user of the telephone device 104 verbally and perform speech recognition analysis to translate the request to text. In another example, the banking system 106 may perform speech recognition on a recording of the request received from the mobile device 102 and generate text. In other instances, the banking system 106 may receive text from the mobile device 102. The banking system 106 may utilize the text, either translated by the banking system 106 or received from the mobile device 102, and determine the banking account information requested, e.g., banking account number, an expiration date, a CVV, or a combination thereof.

In embodiments, banking system 106 may perform a lookup in database or datastore stored in memory, storage, cloud-based storage, etc. to determine the requested banking account information requested and associated with a user of the mobile device 102. For example, the banking system 106 may determine a telephone number associated with the mobile device 102 to determine the user and perform a lookup based on the telephone number. In other instances, the banking system 106 may receive data from the mobile device 102 indicating the user, e.g., a username or other identifier. The data may be communicated by the mobile device 102 to the banking system 106 over a data connection. Embodiments are not limited in this manner and any identifier lookup technique may be used to determine the banking account information associated with the user of the mobile device 102.

The banking system 106 may retrieve the banking account information from a database, memory, storage, and so forth, and generate speech data representing the banking account information requested. The speech data may be in an audible format capable of being played through a speaker of the telephone device 104. In one example, the banking system 106 may utilize a speech synthesizer to generate the speech data. For example, the banking system 106 may determine the banking account information requested, and retrieve the information from memory or a storage device. The requested bank account information may be in a text format, and the banking system 106 may synthesize the text to convert into speech data that can audibly be heard by the user of device 104. The speech synthesizer may include a front-end component and a back-end component to convert the text into words, assign phonetic transcriptions, divide the text into units, and generate sound, as previously discussed. The banking system 106 may cause the speech data to be communicated, via an interface coupled to the voice connection 108, to at least the telephone device 104.

In some instance, the banking system 106 may detect instances when at least a portion of the speech data needs to be repeated. The banking system 106 may detect interference in communication of the speech data or may also be configured to process a request to clarify or repeat the sensitive information. For example, the banking system 106, including a speech recognition analyzer, may detect the request to repeat the banking account information and cause the speech data of the banking account information to be resent. In some instances, the recipient may request for specific banking account information to be repeated. The speech recognition analyzer may determine the information being requested and cause only the specific requested information to be sent to the telephone device 104. In some instances, the banking system 106 may change and/or apply one or more variations to the speech data before it is resent. The one or more variations may include an adjustment of pace of the speech data, an adjustment of volume of the speech data, an adjustment of tone of the speech data, an adjustment of dialect or accent of the speech data, or a combination thereof. Embodiments may also include regenerating and generating new speech data corresponding to the requested repeated information.

The banking system 106 may also utilize one or more security measures, such as using virtual banking account number and/or applying one or more usage restrictions to the sensitive information. For example, the banking system 106 may generate a virtual banking account number and apply one or more usage restrictions to the shared banking account information. More specifically, the banking system 106 may generate and utilize a virtual banking account number corresponding to the banking account number and provide the virtual bank account number to the telephone device 104. The virtual banking account number may be a randomly generated one-time use value or token that may be associated with the banking account providing the funds. The banking system 106 may generate speech data including the virtual banking account number and send the speech data with the virtual banking account number to the telephone device 104. The banking system 106 may also apply one or more usage restrictions to the shared bank account number (virtual or actual). For example, the mobile device 102 may apply a time limit restriction, an amount restriction, and/or a location.

In embodiments, the banking system 106 may provide the banking account information to the user of the telephone device 104, and once confirmed, may disconnect from the three-way connection. In some instances, the mobile device 102 may perform the disconnection and embodiments are not limited in this manner. In some instances, a voice connection 108 between the mobile device 102 and the telephone device 104 may remain established such that the users may finalize the transaction and exchange any additional information.

Figure 2B:
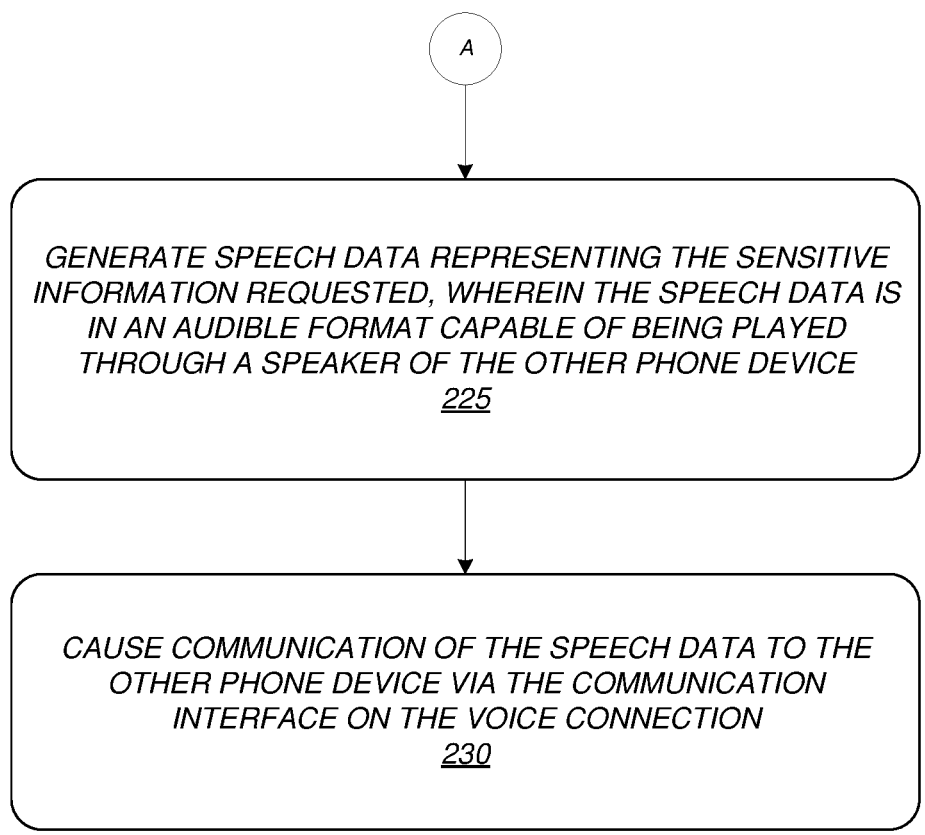
FIG. 2A/2B illustrate a first logic flow to securely share banking accounting information over a voice connection.

FIG. 2A/2B illustrates an example of a logic flow 200 to generate and provide sensitive information over a voice telephone connection. FIG. 2 illustrates an example of a logic flow 200 that may be representative of some or all of the operations executed by one or more embodiments and systems described herein, such as those discussed above with respect to a mobile device 102 in FIG. 1A. Moreover, the one or more operations may be performed by an app on a mobile device, such as a banking app executing on mobile device 502, as similarly found in FIG. 5.

In embodiments, the logic flow 200 includes detecting a request to provide sensitive information over a voice connection at block 205. In one example, the request may be detected by a banking app, operating on a mobile device having a voice connection established with another device, such as a telephone device or mobile device. In embodiments, the request may be a verbal request or sound communicated by the user of the other device over the voice connection. The app may include one or more processes executing on the mobile device to detect one or more specific keywords or phrases, e.g., "Please provide me your credit card information." In another example, the request may be a user input detected by the mobile device. For example, the user, being asked for credit card information, may invoke the banking app via a user input on the mobile device to provide the requested banking account information. The banking app may initiate operations and provide a user an interface to send speech data including the requested information to the user of the other phone device. For example, the user may interface with a graphical user interface (GUI) of the mobile device to select one or more of a bank account number, expiration date, CVV, or combination thereof to send to the other device.

At block 210, the logic flow 200 includes identifying the sensitive information to send to the other device. For example, the banking app may include a speech recognition analyzer to automatically detected the requested banking account information. In another example, the banking app may determine the requested information based on one or more user inputs on the mobile device, as mentioned. The banking account information may include a banking account number, an expiration date, a card verification value, or a combination thereof.

The logic flow 200 includes performing an authentication operation to authenticate a user of the mobile device as one of one or more authorized users or owners of the sensitive information at block 215. For example, the banking app may require the user to enter a username and password to authenticate the user to provide the banking or credit card account information. Other authentication methods may be utilized, e.g., biometric, pattern entry, and so forth.

In embodiments, if the authentication operation is unsuccessful, the logic flow 200 includes preventing communication of the sensitive information to the other phone device at block 220. For example, the banking app may not provide the banking account information for communication over the voice connection. In some instances, the banking app may notify the user of the mobile device that the authentication failed and that the banking account information will not be provided. If the authentication operation is successful, the logic flow 200 includes generating speech data representing the sensitive information requested at block 225. For example, the banking app may include a synthesizer to convert text data representing the banking account information into sound or speech data. The speech data may be in an audible format capable of being played through a speaker of the other phone device, for example. The speech data to communicate may be determined by the banking app or other software as previously discussed. At block 230, the logic flow 200 further includes causing communication of the speech data to the other phone device via the communication interface on the voice connection if the authentication operation is successful.

Figure 3:
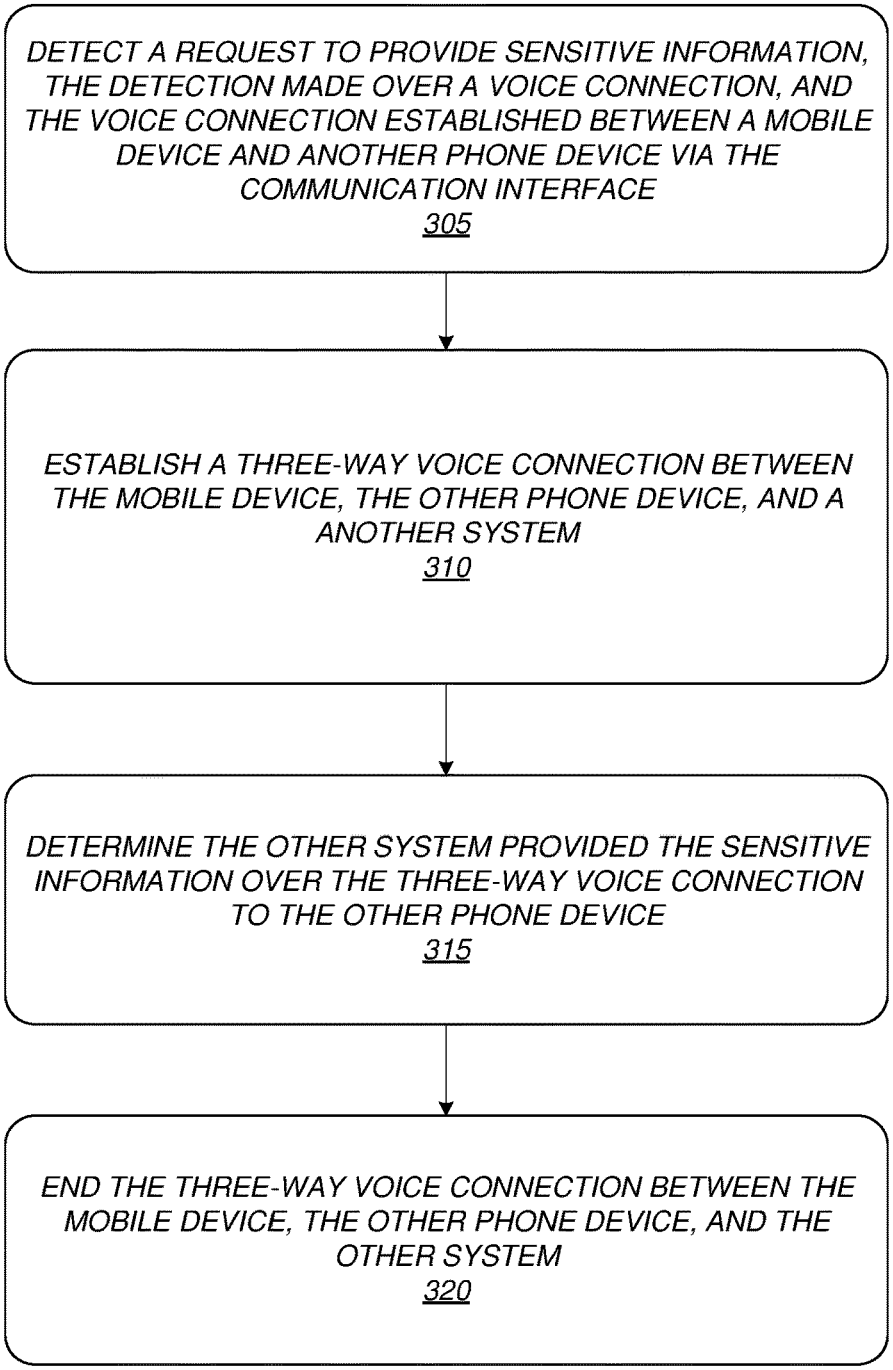
FIG. 3 illustrates a second logic flow to securely share banking accounting information over a voice connection.

FIG. 3 illustrates an example of a logic flow 300 to provide sensitive information over a three-way connection via a banking system. FIG. 3 illustrates an example of a logic flow 300 that may be representative of some or all of the operations executed by one or more embodiments and systems described herein, such as those discussed above in FIG. 1B. Moreover, one or more operations may be performed by an app, such as a banking app, executing on a mobile device, as similarly found in FIG. 5.

At block 305, the logic flow 300 includes detecting a request to provide sensitive information. In embodiments, the detection may be made over a voice connection established between a mobile device and another phone device. For example, a banking app may detect via speech-recognition analysis one or more keywords associated with requesting banking account information.

At block 310, the logic flow 300 includes establishing a three-way voice connection between the mobile device, the other phone device, and a system. For example, a banking app on the mobile device may initiate a voice connection with a banking system and establish a three-way voice connection. The banking app may include a routine to initiate a call or may utilize another app on the mobile device to initiate the call. Embodiments are not limited in this manner.

In embodiments, the mobile device may communicate with the banking system an indication to provide the requested sensitive information. For example, the mobile device may send the request to the banking system. The request may be an audio sample format or text based on a voice-to-text conversion. In some instances, the banking system may instruct or having the user of the other phone device repeat the request. Embodiments are not limited in this manner. The banking system may provide the requested information over the voice connection between the mobile device, the other phone device, and the system. As previously discussed, the banking system may also perform authentication of the user of the mobile device prior to providing the requested information. If the user fails to authenticate, the banking system may provide an indication that the information cannot be provided.

At block 315, the logic flow 300 includes determining the system provided the sensitive information over the three-way voice connection to the other phone device. For example, the banking app on the mobile device may receive an indication from the banking system that the information has been provided to the other phone device of a data connection. In another example, the banking app may "hear" the banking system provide the information to the other phone device over the three-way connection and confirm the transfer of the information is complete.

At block 320, the logic flow 300 includes ending the three-way voice connection between the mobile device, the other phone device, and the banking system. In some instances, a voice connection may be maintained between the mobile device and the other phone device to finalize the transaction. A banking app may break the connection to the banking system while maintaining the connection with the other phone device, for example.

Figure 4:
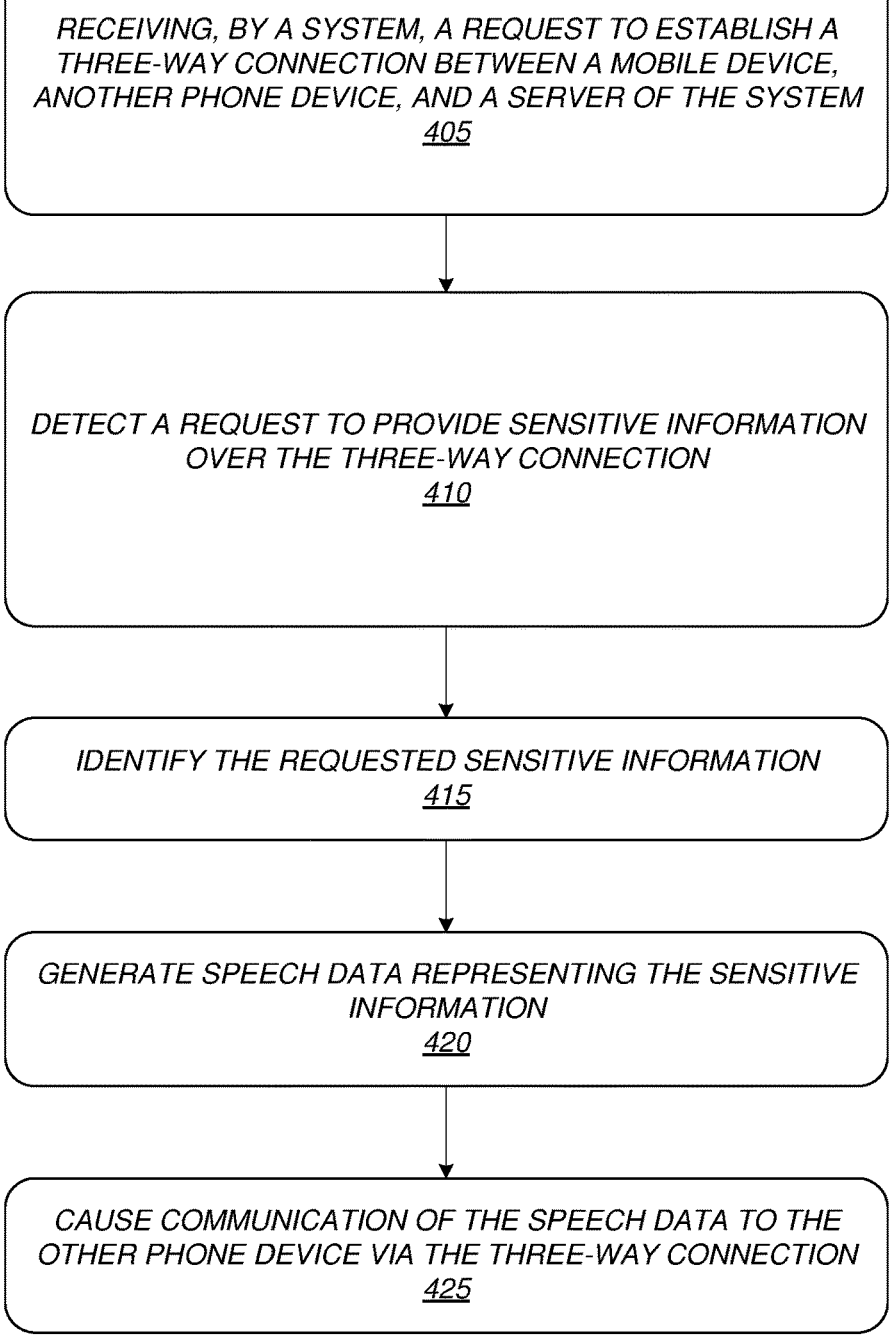
FIG. 4 illustrates a third logic flow to securely share banking accounting information over a voice connection.

FIG. 4 illustrates an example of a logic flow 400 to provide sensitive information over a three-way connection.

FIG. 4 illustrates an example of a logic flow 400 that may be representative of some or all of the operations executed by one or more embodiments and systems described herein, such as those discussed above in FIG. 1B. Moreover, the one or more operations may be performed by one or more software routines executing on a system, such as a banking system as similarly found in FIG. 6.

At block 405, the logic flow 400 includes receiving a request to establish a three-way connection between a mobile device, another phone device, and a server of the system. In one example, a banking system may be configured to provide speech data associated with sensitive information, such as banking account information. The banking system may be configured to receive and establish a voice connection (or three-way voice connection) from another device, such as a mobile device. For example, the banking system may receive a call from a mobile device, answer the call, and establish a connection with the mobile device and another phone device.

In embodiments, the logic flow 400 includes detecting a request to provide sensitive information over a three-way voice connection, wherein the three-way voice connection is established between the mobile device, the other telephone device, and the system at block 410. In one example, the request may be detected by software or one or more routines executing on the banking system. The request may be a verbal request or sound communicated by the user of the other device over the voice connection. The software may include one or more processes executing on the banking system to detect one or more specific keywords or phrases. In another example, the banking system may receive data from the mobile device over a data connection indicating the request for the banking account information. The data may include a recording of the requested banking account information or the information a translated text format. In another example, the system may request the user of the other phone device, i.e., the requestor, to repeat the request over the voice connection.

At block 415, the logic flow includes identifying the requested sensitive information. For example, if the request is not in a translated text format, the system may apply a speech-recognition analyzer to identify the sensitive information in the request. As mentioned, the sensitive information may include banking account information such as a banking account number, an expiration date, a card verification value, or a combination thereof.

In embodiments, the logic flow 400 includes generating speech data representing the sensitive information requested at block 420. For example, the banking system may include a synthesizer to convert text data representing the sensitive information into sound or speech data. The speech data may be in an audible format capable of being played through a speaker of the other phone device. At block 425, the logic flow 400 includes causing communication of the speech data to the other phone device via the communication interface over the three-way connection. In embodiments, the banking system may perform additional operations to provide the information, such as repeating one or more of the requested items. Once the information has been provided successfully to the other phone device, the three-way connection may be closed between the banking system, the mobile device, and the other phone device.

Figure 5:
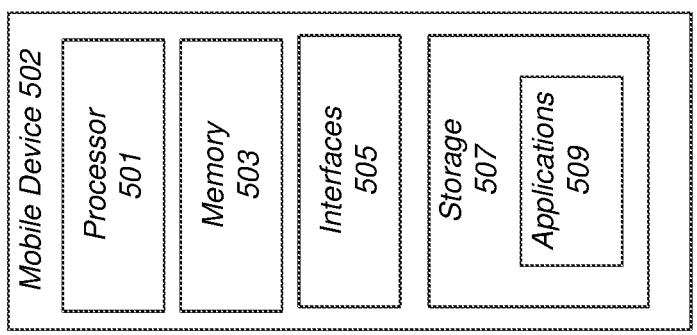
FIG. 5 illustrates an example of a mobile device.

FIG. 5 illustrates a detailed view of a mobile device 502, which may be similar to or the same as mobile device 102. In the illustrated, the mobile device 502 includes processor 501, memory 503, interfaces 505, and storage device 507. The processor 501 may include one or more processing cores to process information and data. Moreover, a processor 501 can include one or more processing devices, such as a microprocessor manufactured by Intel™, AMD™, or any of various processors. The disclosed embodiments are not limited to any type of processor(s).

Coupled with the processor 501, the mobile device 502 may also include memory 503. The memory 503 can include one or more memory (volatile or non-volatile) devices configured to store instructions used by the processor 501 to perform one or more operations consistent with the disclosed embodiments. For example, memory 503 can be configured with one or more software instructions, such as programs and applications that can perform one or more operations when executed by the processor 501. In embodiments, the memory 503 may store instructions and data on a temporary basis as they are about to be processed by the processor 501.

In embodiments, the mobile device 502 may include interfaces 505 such as wireless and wired communication interfaces. The communication interfaces may operate in accordance with one or more standards, such as IEEE 802.11, third, fourth, fifth (NG) generation cellular standards, LTE, CDMA, IEEE 802.3, and so forth. Embodiments are not limited in this manner. The interfaces 505 may include one or more input devices, such as touch-screen inputs, button inputs, camera(s), microphone(s), or any other type of input device.

In embodiments, the mobile device 502 may further include a storage device 507 coupled with the processor 501 and memory 503. The storage device 507 may include HDDs, flash memory devices, optical storage devices, floppy storage devices, etc. In some instances, the storage devices 507 may include cloud-based storage devices that may be accessed via a network interface. The storage device 507 may store one or more applications 509 that include instructions that may be executed by the processor 501.

In embodiments, one or more applications 509 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. The one or more applications may also include a web browser, such as Chrome®, Internet Explorer®, Safari®, Firefox®, and so forth. The web browser may be utilized by a user to surf or browse the websites of the Internet.

In embodiments, the mobile device 502 may include one or more dialing or phone apps configured to make voice telephone calls over voice connections. A phone app may be configured to make telephone calls over a WiFi connection, a cellular connection, or a combination thereof. For example, a phone app may be configured to initiate a phone call over a WiFi Connection and switch to a cellular connection, and vice versa. In embodiments, the phone app may be a native app provided with the operating system. Embodiments are not limited in this manner.

In embodiments, the one or more applications 509 may include a banking app configured to provide banking functions, such as accessing a user's banking account, depositing and withdrawing funds, checking balance, reviewing and/or modifying settings, and so forth. In embodiments, the banking is also configured to provide requested banking account information to another party, such as a person on the other end of a telephone call. As discussed, the banking app may detect requests for banking account information, generate an audible format of the requested information, and provide the information to the other person on the other device verbally. The banking app may provide the information to the other phone such that it's not played through a speaker of the mobile device 502 for other people to hear, e.g., out the speakerphone device of the mobile device 502. In embodiments, the banking app may authenticate and/or verify a user of the mobile device 502.

In some instances, the banking app may be configured to have a third-party provide the requested banking account information over a three-way voice connection. As discussed, the banking app may detect the request for the information and establish a call with a banking system and/or a call center system to provide the information. The mobile app may provide information to the third-party system, an indication of whether a user is authenticated, a recording of the request, a text version of the request, and so forth. The banking app is also configured to breakdown or disconnect from the third-party system once the information has been provided to the other party. The banking app may maintain a connection with the other party and phone device until the transaction is complete.

Figure 6:
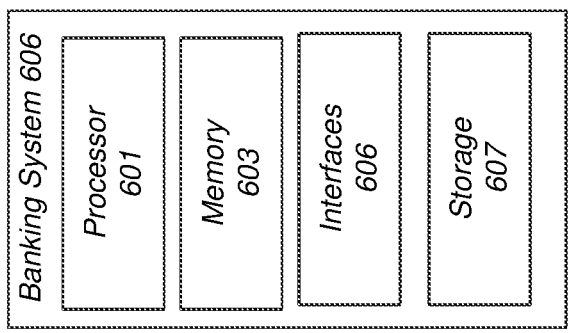
FIG. 6 illustrates an example of a banking system.

FIG. 6 illustrates a detailed view of a banking system 606, which may be the same as banking system 106 illustrated in FIG. 1B. In embodiments, the banking system 606 includes one or more servers and/or cloud-based computing components. In one example, the components of the banking system 606 include processor 601, memory 603, interfaces 605, and storage device 607. The processor 601 may include one or more processing cores to process information and data. Moreover, a processor 601 can include one or more processing devices, such as a microprocessor manufactured by Intel™, AMD™, or any of various processors. In embodiments, the processor 601 may include cloud-based processing components that may be shared with other systems. The disclosed embodiments are not limited to any type of processor(s).

Coupled with the processor 601, the banking system 606 may also include memory 603. The memory 603 can include one or more memory (volatile or non-volatile) devices configured to store instructions used by the one or more processors 601 to perform one or more operations consistent with the disclosed embodiments. For example, memory 603 can be configured with one or more software instructions, such as programs and applications that can perform one or more operations when executed by the processor 601. In embodiments, the memory 603 may store instructions and data on a temporary basis as they are about to be processed by the processor 601. In embodiments, the memory 603 may be cloud-based memory resources.

In embodiments, the banking system may include interfaces 605 such as wireless and wired communication interfaces. The communication interfaces may operate in accordance with one or more standards, such as IEEE 802.11, third, fourth, fifth (NG) generation cellular standards, LTE, CDMA, IEEE 802.3, and so forth. Embodiments are not limited in this manner. The interfaces 605 may include one or more input devices, such as touch-screen inputs, button inputs, camera(s), microphone(s), or any other type of input device.

In embodiments, the banking system may further include a storage device 607 coupled with the processor 601 and memory 603. The storage device 607 may include HDDs, flash memory devices, optical storage devices, floppy storage devices, etc. In some instances, the storage devices 607 may include cloud-based storage devices that may be accessed via a network interface. The storage device 607 may store one or more applications that include instructions that may be executed by the processor 601.

In embodiments, one or more applications may include an operating system, such as Windows®, Chrome®, Linux®, Apple OS®, UNIX®, and so forth. In embodiments, the one or more application including one or more dialing or phone apps configured to make voice telephone calls over voice connections. For example, the banking system 606 may include a phone application capable of handling one or more calls for banking account information. In embodiments, the phone application of the banking system is capable of handling multiple simultaneous calls from any number of mobile devices.

In embodiments, the one or more applications software to provide the banking account information, e.g., speech-recognition analyzer, synthesizer, and so forth. The software may be configured to provide requested banking account information to another party, such as a person on the other end of a telephone call. As discussed, the software may be configured to detect requests for banking account information or process recorded or text requests from a mobile device, generate an audible format of the requested information, and provide the information to the other person on the other device verbally.

Figure 7:
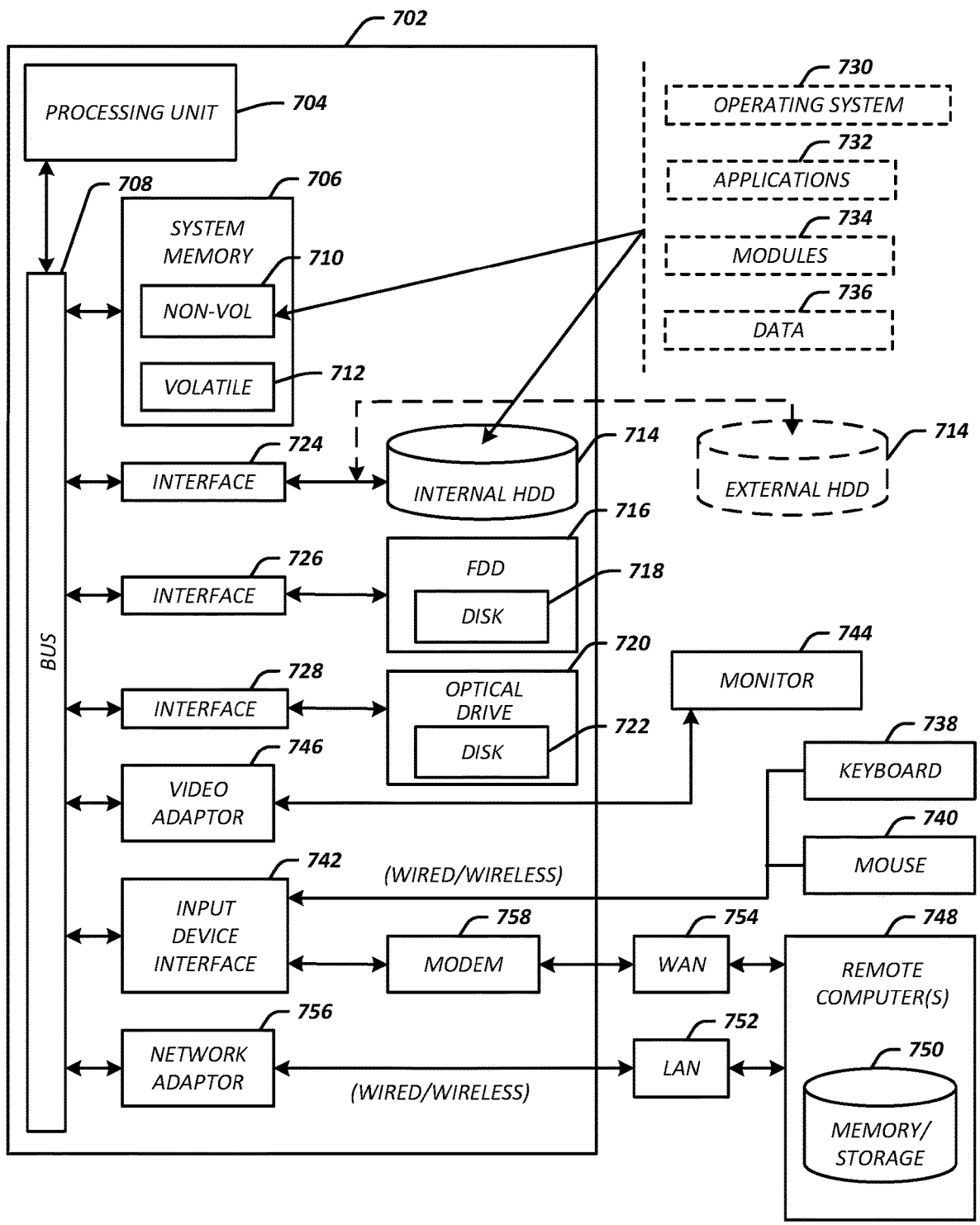
FIG. 7 illustrates an example of a computer architecture representative of one or more systems and devices discussed herein.

FIG. 7 illustrates an embodiment of an exemplary computing architecture 700 that may be suitable for implementing an apparatus, system, and/or method for performing operations associated with the implementation of one or more of the disclosed techniques. In various embodiments, the computing architecture 700 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704. In some embodiments, processing circuitry of processing unit 704 and/or other processing circuitry of computing architecture 700 may be operative to perform operations associated with the logic flows, and/or other operations associated with implementation of one or more of the disclosed techniques. In some embodiments, such processing circuitry may be coupled to a network interface of computing architecture 700.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
   a communication interface;
   a memory to store an application; and
   a processor circuit coupled with the communication interface and the memory, the processor circuit to:
   detect, by the application executable on the processor circuit, a request to provide a banking account information over a voice connection, wherein the voice connection is established between the mobile device and a phone device via the communication interface, the phone device being separate and distinguishable from the mobile device;
   apply, by the application, a speech-recognition analyzer to the request to generate an analyzed request, and identify, using the analyzed request, the banking account information associated with the request, wherein the banking account information comprises a banking account number, an expiration date, a card verification value, or a combination thereof;
   perform, by the application, an authentication operation to authenticate a user of the mobile device as one of one or more authorized users of a bank account associated with the banking account information;
   if the authentication operation is successful:
   generate, by the application, speech data representing the banking account information requested, wherein the speech data is in an audible format capable of being played through a speaker of the phone device; and
   cause, by the application, communication of the speech data to the phone device via the communication interface on the voice connection; and
   if the authentication operation is unsuccessful, prevent communication of the banking account information to the phone device.

2. The mobile device of claim 1, wherein the request is in the audible format and is automatically detected by the speech-recognition analyzer, the speech-recognition analyzer to provide an indication of the request to the application.

3. The mobile device of claim 1, wherein the voice connection is established over a cellular telephone network, a public switched telephone network, a voice over internet protocol network, or a combination thereof.

4. The mobile device of claim 1, the processor circuit, to perform the authentication operation, to:
prompt, on a display device, for a username and a password to access the application;
receive, via a user input device, a username entry and a password entry; and
authenticate the user of the mobile device as one of the one or more authorized users of the bank account when the username entry matches the username and the password entry matches the password.

5. The mobile device of claim 1, the processor circuit, to perform the authentication operation, to:
receive, via an input device, a biometric input; and
authenticate the user of the mobile device as one of the one or more authorized user of the bank account when the biometric input matches an authentic biometric input.

6. The mobile device of claim 1, the processor circuit to:
generate a virtual credit card number corresponding to the banking account number; and
generate the speech data comprising at least the virtual credit card number.

7. The mobile device of claim 6, the processor circuit to determine one or more restrictions for the virtual credit card number, wherein the one or more restrictions comprise a time limit restriction, an amount restriction, a location restriction, or a combination thereof.

8. The mobile device of claim 7, the processor circuit to:
determine a phone number associated with the phone device; and
determine at least one of the one or more restrictions based on the phone number associated with the phone device.

9. The mobile device of claim 1, the processor circuit to:
detect, via the application, a request to clarify the banking account information over the voice connection; and
repeat, via the application, communication of the speech data to the phone device via the communication interface on the voice connection.

10. The mobile device of claim 9, the processor circuit to apply, via the application, one or more variations to the speech data to repeat communication of the speech data to the phone device, wherein the one or more variations comprise, an adjustment of pace of the speech data, an adjustment of volume of the speech data, or a combination thereof.

11. A system, comprising:
a communication interface;
a memory; and
a processor circuit coupled with the communication interface and the memory, the processor circuit to:
detect, via the communication interface, a request to provide banking account information over a three-way voice connection, wherein the three-way voice connection is established between a first phone device, a second phone device, and the system, the second phone device being separate and distinguishable from the first phone device;
apply a speech-recognition analyzer to the request to generate an analyzed request, and identify, using the analyzed request, the banking account information associated with the request, wherein the banking account information comprises a banking account number, an expiration date, a card verification value, or a combination thereof;
generate speech data representing the banking account information requested, wherein the speech data is in an audible format capable of being played through a speaker of the second phone device; and
cause, via the communication interface, communication of the speech data on the three-way voice connection.

12. The system of claim 11, the processor circuit:
receive a telephone call from the first phone device to establish the three-way voice connection, wherein the first phone device is associated with a bank account; and
establish the three-way voice connection with the first phone and the second phone device.

13. The system of claim 12, wherein the request to provide the banking account information is received over the three-way voice connection from the second phone device.

14. The system of claim 12, the processor circuit to perform an authentication operation to authenticate the first phone device is associated with the bank account, wherein the authentication operation utilizes a telephone number associated with the first phone device to authenticate.

15. The system of claim 14, the processor circuit to halt establishment of the three-way voice connection and/or communication of the speech data if the authentication operation is unsuccessful.

16. The system of claim 11, wherein the three-way voice connection is established over a cellular telephone network, a public switched telephone network, a voice over internet protocol network, or a combination thereof.

17. The system of claim 11, the processor circuit to:
generate a virtual credit card number corresponding to the banking account number; and
generate the speech data comprising at least the virtual credit card number.

18. The system of claim 17, the processor circuit to:
determine one or more restrictions for the virtual credit card number, wherein the one or more restrictions comprise a time limit restriction, an amount restriction, a location restriction, or a combination thereof;
determine a phone number associated with the second phone device; and
determine at least one of the one or more restrictions based on the phone number associated with the second phone device.

19. The system of claim 11, the processor circuit to:
detect a request to clarify the banking account information over the three-way voice connection;
apply one or more variations to the speech data to repeat communication of the speech data to the second phone device, wherein the one or more variations comprise, an adjustment of pace of the speech data, an adjustment of volume of the speech data, or a combination thereof; and
repeat communication of the speech data via the communication interface on the three-way voice connection.

20. A mobile device, comprising:
a communication interface;
a memory to store an application; and a processor circuit coupled with the communication interface and the memory, the processor circuit to:
  detect, by the application executable on the processor circuit, a request to provide banking account information over a voice connection, wherein the voice connection is established between the mobile device and a phone device via the communication interface, the phone device being separate and distinguishable from the mobile device;
  apply, by the application, a speech-recognition analyzer to the request to generate an analyzed request, and identify, using the analyzed request, the banking account information associated with the request, wherein the banking account information comprises a banking account number, an expiration date, a card verification value, or a combination thereof;
  generate, by the application, speech data representing the banking account information requested, wherein the speech data is in an audible format; and
  cause, by the application, communication of the speech data to the phone device via the communication interface on the voice connection.

\* \* \* \* \*